United States Patent
Gawa et al.

[11] Patent Number: 5,184,651
[45] Date of Patent: Feb. 9, 1993

[54] WIRE WINDING APPARATUS

[75] Inventors: Tomohiro Gawa; Mamoru Inoue, both of Hirakata; Tokuhito Hamane, Nara; Fujio Kataoka, Takefu, all of Japan

[73] Assignee: Matsushita Electric Industrial Co., Ltd., Kadoma, Japan

[21] Appl. No.: 885,015

[22] Filed: May 20, 1992

Related U.S. Application Data

[63] Continuation of Ser. No. 602,159, Oct. 24, 1990, abandoned.

[51] Int. Cl.[5] ............................................. B21P 15/04
[52] U.S. Cl. ..................................................... 140/115
[58] Field of Search ................... 242/7.06, 7.17, 7.19; 140/93 R, 111, 113, 115, 119

[56] References Cited

U.S. PATENT DOCUMENTS

1,278,043  9/1918  Simpson ............................. 242/7.19
3,338,272  8/1967  Berg et al. ............................. 140/115

Primary Examiner—Lowell A. Larson
Attorney, Agent, or Firm—Cushman, Darby & Cushman

[57] ABSTRACT

A wire winding apparatus for connecting a plurality of fine wires and a surface-insulated solid wire such as an enamel coated wire. Clamp members clamp an end of the solid wire. Then a winding mechanism pinches an end of the plurality of fine wires with a predetermined force and rotate around the clamped solid wire. During the winding operations, a moving mechanism moves the winding mechanism in a direction of the clamped end of the solid wire. Prior to winding, any excess of the solid wire and plurality of fine wires is trimmed away. After the winding, the solid wire and plurality of fine wires are mechanically and electrically connected.

8 Claims, 10 Drawing Sheets

WIRE WINDING APPARATUS

This is a continuation of application Ser. No. 07/602,159, filed on Oct. 24, 1990, which was abandoned.

BACKGROUND OF THE INVENTION

1. Field of the Invention

The present invention relates to a wire connecting apparatus for connecting one type of wire to another type of wire, and especially relates to an apparatus for connecting plural fine wires to a coil wire of surface-insulated solid wire which is used as a coil of electric apparatus.

2. Description of the Prior Art

A surface-insulated solid wire which is to be used as a coil of electric apparatus is generally connected to plural fine wires by soldering or using a crimp-style terminal.

Figure 8:
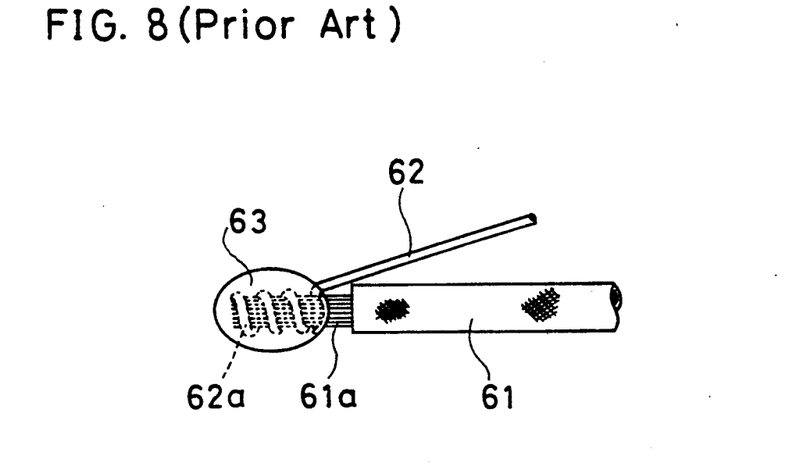
FIG. 8 is the front view showing the conventional method for connecting the wires.

In the case of soldering, as shown in FIG. 8, a non-insulated part 62a of a surface-insulated solid wire 62, with its insulation coat such as enamel or the like removed previously, is wound around a conductive part 61a of plural fine wires 61. And the conductive part 61a and the wound non-insulated part 62a are soldered with each other. The soldered part is designated by numeral 63 in the figure.

For obtaining a reliable contact, it is necessary to visually observe the winding of the non-insulated part 62a of the surface-insulated solid wire 62 around the conductive part 61a of the plural fine wires 61 for electrically contacting thereto.

Figure 9:
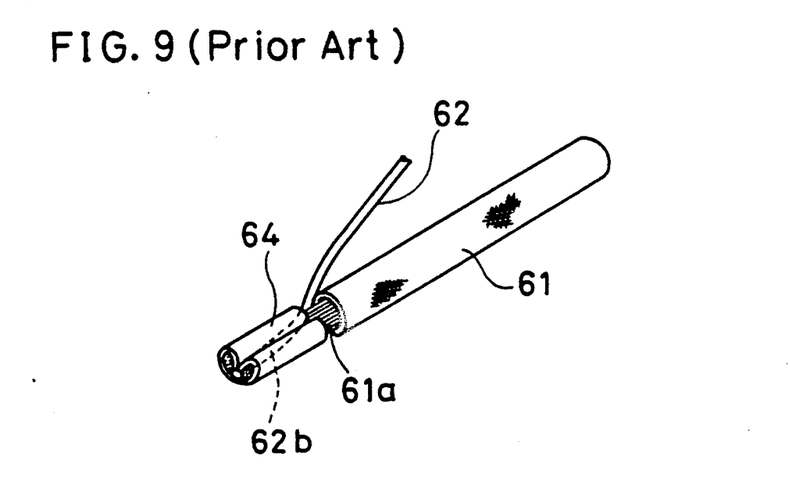
FIG. 9 is the perspective view showing the other conventional method for connecting the wires.

In another case of using a terminal member 64, as shown in FIG. 9, the conductive part 61a of the plural fine wires 61 and an end part 62b of the surface-insulated solid wire 62 with its insulation coat retained are put into an inner space of the terminal member 64 which has saw-tooth shaped protrusions on its inner edges. The terminal member 64 is pressed deformed to grasp the plural fine wires 61 therein for making a firm contact of the end part 62b of the surface-insulated solid wire 62. At this time, the saw-tooth shaped protrusions scratches and removes the surface insulation coat of the end part 62b.

In this method, it is necessary to observe the way of deformation of the terminal member 64.

Neither of the above-mentioned methods of connecting of the surface-insulated solid wire 62 and the plural fine wires 61 have been operated in an automated manner.

Figure 10A:
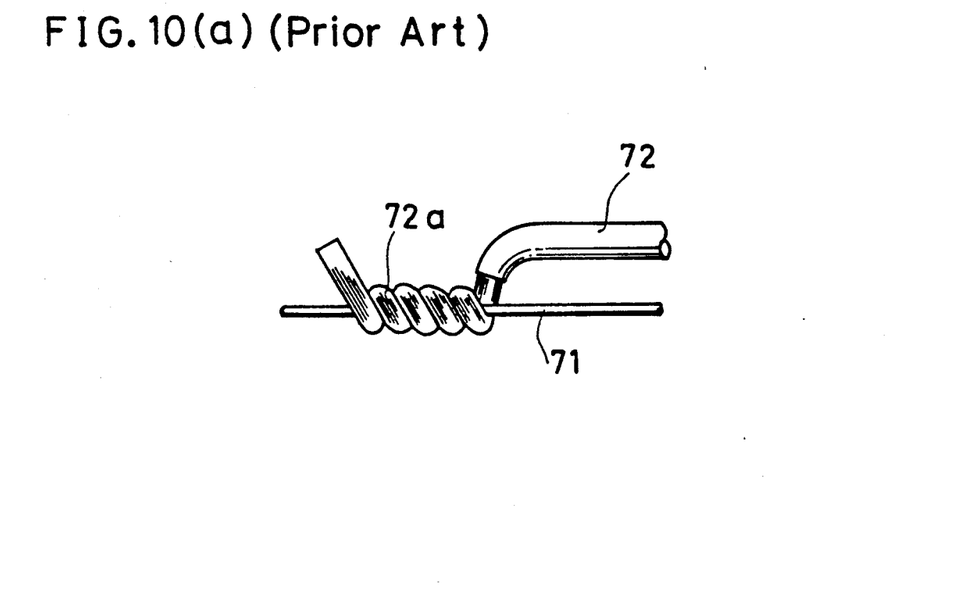
FIGS. 10(a) and 10(b) are the side views showing still the other conventional method for connecting the wires.
Figure 10B:
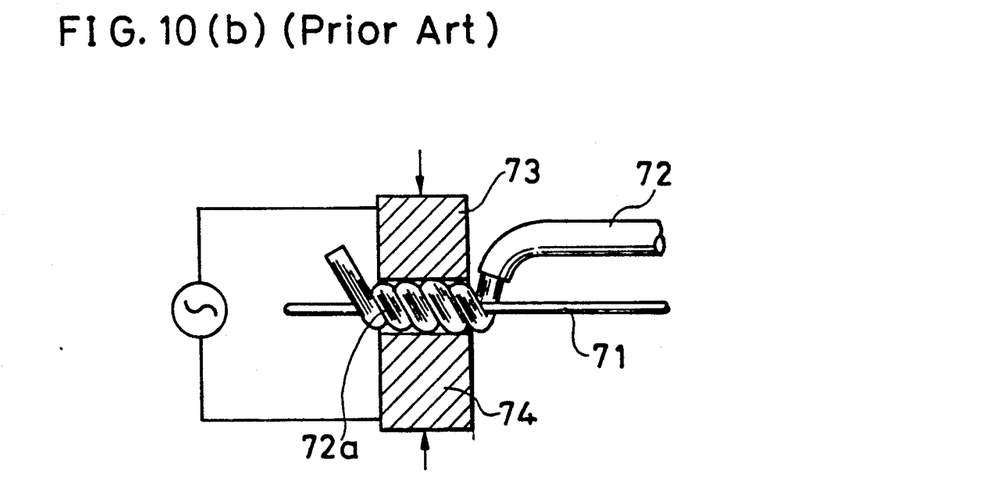

There have been further proposals for improving the above-mentioned conventional methods. In FIG. 10, a conductive part 72a of the plural fine wires 72 is wound around a surface-insulated solid wire 71 with the insulation coat. The wound conductive part 72a is pinched between upper and lower pinching members 73 and 74 as shown in FIG. 10(b). The conductive part 72a is pressed by the pinching members 73 and 74. After that, when an electric power is supplied to the pinching members 73 and 74, the pinching members are heated, and the insulation coat on the surface-insulated solid wire 71 is melted to be removed by the heat of the pinching members 73 and 74. Thereby, the plural fine wires 72 and the surface-insulated solid wire 71 are electrically connected.

In the above-mentioned method shown in FIGS. 10(a) and 10(b), the winding operation of the plural fine wires 72 around the surface-insulated solid wire 71 is executed relatively easily and automatically, since it is not necessary to remove the insulation coat on the surface-insulated solid wire 71 as a preliminary matter. Full automation of the connection of the wires 71 and 72, however, could not easily be achieved, because both of the wires 71 and 72 have considerable flexibility, and thereby a delicate manual operation has been necessary.

SUMMARY OF THE INVENTION

Purpose of the present invention is to provide a fully automated wire connecting apparatus for achieving a fully automatic connection of wires by winding a plurality of flexible fine wires to a flexible solid wire.

A wire connecting apparatus in accordance with the present invention comprises:

holding an end means for pinching and holding a first wire with a tension:

winding means which pinches an end of a second wire to be wound around the first wire with a tension lower than the tension holding the first wire by the holding means, and rotates the pinched end part of the second wire around the first wire for winding the pinched end part of the second wire around the first wire at its end pinched by the holding means; and moving means for moving the winding means in a direction towards the pinched end of the first wire.

In the above-mentioned wire connecting apparatus in accordance with the present invention, even when both of the first and second wires have flexibility, the first wire, for example, a surface-insulated solid wire used as a coil of an electric apparatus is pinched and straighted by the stretching means. Furthermore, an end of the second wire, for example, plural fine wires, are pinched by the winding means. The winding means is rotated around the first wire and moved in the direction of the end of first wire by the moving means. Thereby, the second wire is wound around the first wire. At this time, a tension is applied to the second wire, so that the second wire is tightly wound.

Preferably, the apparatus is so configured that the rotation speed of the winding means and the moving speed of the moving means are widely variable. Also, the turning number and the pitch of the wound second wire are freely selected. When the moving means moves in an axial direction by a distance of ½ or ¾ of the diameter of the second wire during one turn of the winding means, the second wire is wound at its highest tension.

The holding apparatus comprises: inner pinching members for pinching one end of a first wire, tension supplying device for supplying a tension force to the inner pinching means in the direction of the stretching of the first wire, and first clamping members for clamping the first wire at a predetermined distance from the end of the first wire.

The winding apparatus comprises: a tube member mounted in a rotating manner on the moving device, rotation device for rotating the tube device, outer pinching members mounted on the tube member which open and shut for pinching the second wire at a predetermined distance from the first wire on a plane vertical to the orientation of the stretched first wire, pinching force supplying device supplying a pinching force to the outer pinching members for pinching the second wire by shutting thereof; and second clamping device clamping the second wire at a predetermined distance from the end of the second wire.

Therefore, when the tube member mounting the outer pinching members is rotated by the rotation device and moved by the moving member at the same time, the winding of the second wire on the first wire is automatically executed.

Furthermore, holding device for holding ends of the first and the second wires are retractably provided. Device which pulls up wire is provided between the holding device and the second clamping device in the vicinity of the second clamping device for engaging and pulling up the second wire. Furthermore, wire cutting device is provided in the vicinity of the holding device for cutting one of or both of the end parts of the first and the second wires which protrude from the holding device. Thereby, the inner and outer pinching device are operate without the interference of the protruded wires.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

A preferred embodiment of a wire connecting apparatus in accordance with the present invention is described referring to FIGS. 1(a), 1(b), 2, 3, 4, 5, 6(a), 6(b) and 7.

Figure 7A:
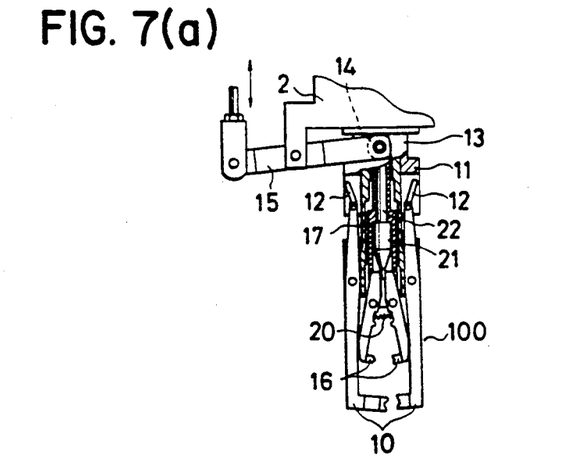
FIG. 7(a)-(b) is a plan view showing arrangement of stations where the rotation of the jig units are to be stopped for continuously connecting plural sets of the wires which are to be connected.
Figure 7B:
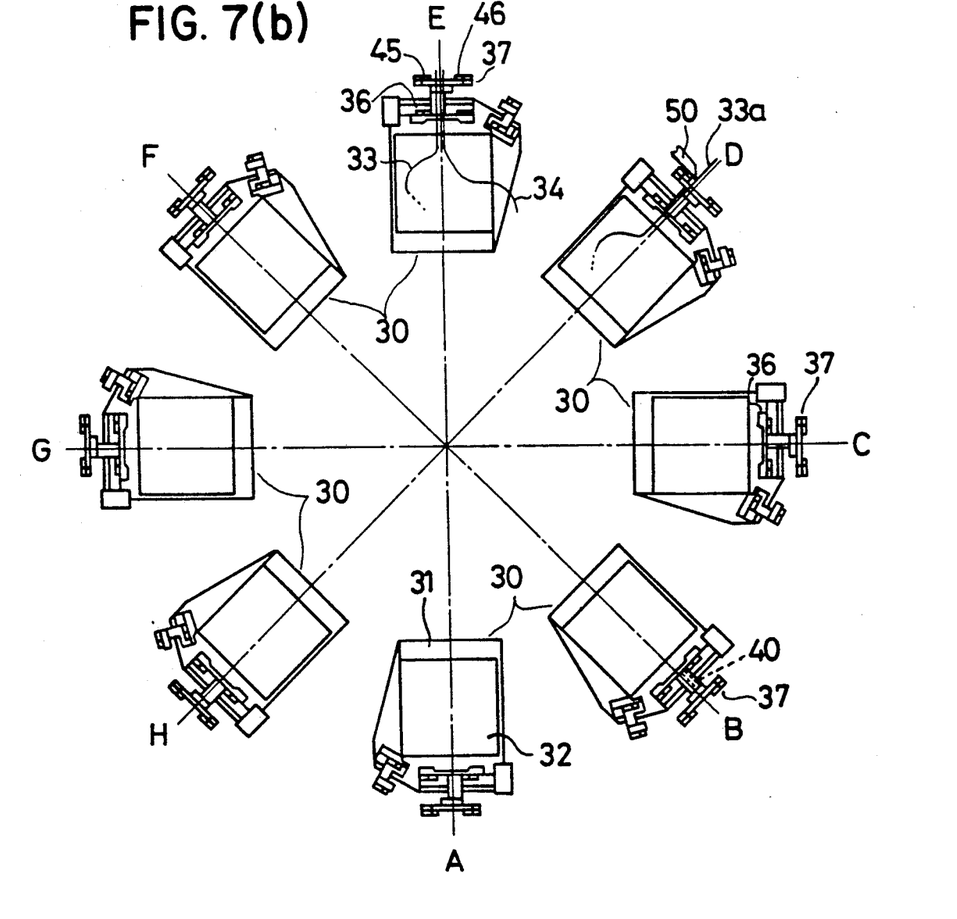

FIG. 7 shows an over-all arrangement of the wire connecting apparatus. In FIG. 7, eight of jig units 30 . . . for holding works 32 are arranged at a predetermined angle on an index table (not shown in the figure).

Figure 3:
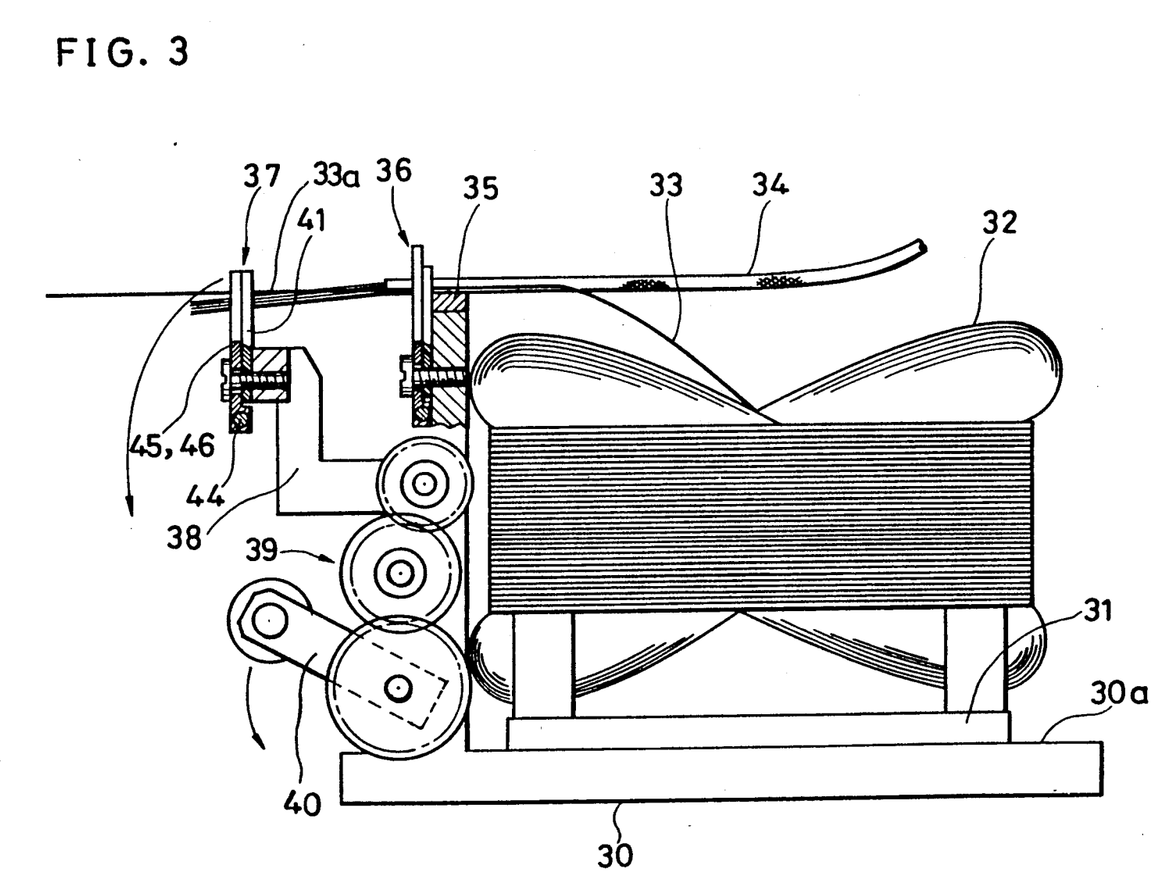
FIG. 3 is a side view showing a jig unit of the wire connecting apparatus in accordance with the present invention, and especially showing a condition that a work is set on the jig unit and a surface-insulated solid wire and plural fine wires which are to be wound and connected are held on a holding unit.

As shown in FIG. 3, the jig unit 30 comprises: a base part 30a on which a pallet 31 for holding a work 32 is to be placed; a positioning member 36 for positioning stem parts of connecting parts of a surface-insulated solid wire 33 and plural fine wires 34; a clamp holder 35 neighboring the positioning member 36; and a holding member 37 for holding end parts of the surface-insulated solid wire 33 and the plural fine wires 34. The holding member 37 is fixed on an end of a swing arm 38, which is rotated by a motion of an operation arm 40 via gear train 39. Thereby, the holding member 37 is movable between a holding position (upper position) and a retracting position (swung down position).

Figure 4:
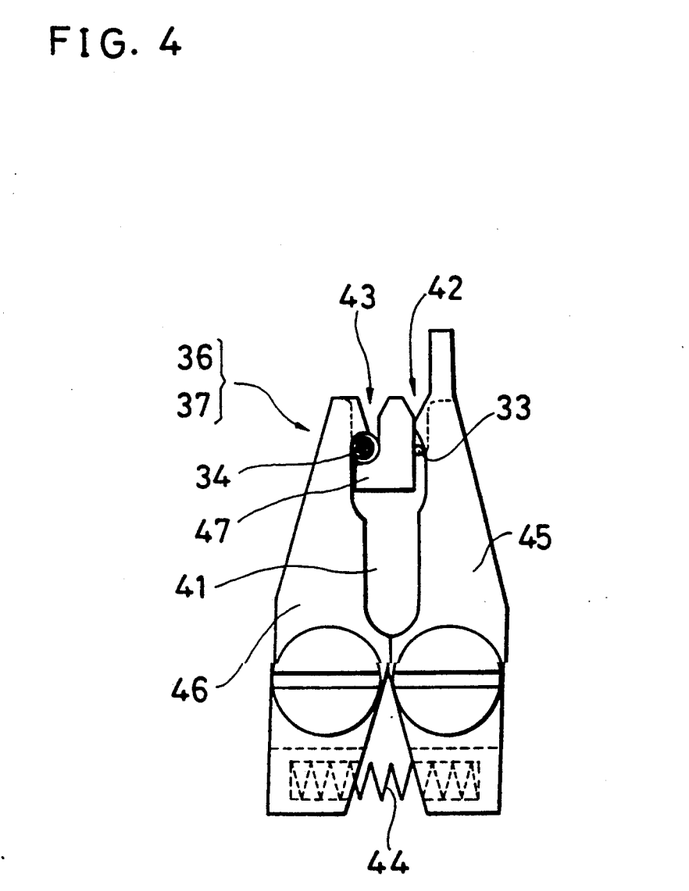
FIG. 4 is a front view of the holding unit shown in FIG. 3.

The positioning member 36 and the holding member 37 have substantially the same constitution. That is, as shown in FIG. 4, a fixed plate 41 has two grooves 42 and 43 on its upper periphery to which the surface-insulated solid wire 33 and the plural fine wires 34 are respectively inserted. A pair of movable pinching members 45 and 46 are mounted in a rotating manner on a front face of the fixed plate 41 in a manner to be able to open and shut (pinch position), and the movable pinching members 45 and 46 are forcefully shut by a spring 44. Thereby, the surface-insulated solid wire 33 and the plural fine wires 34 are held at their ends. A guide plate 47 is fixed on the front face of the fixed plate 41 in a manner to be on the same plane as the movable pinching members 45 and 46.

Respective jig units 30 . . . are gradually carried by intermittent rotation of the table to stations A, B, C, D, E, F, G and H shown in FIG. 7 which are circularly positioned.

On the station A, the pallet 31 which holds the work 32 such as a coil of an electric apparatus is carried on and out from the jig unit 30.

On the station B, the holding apparatus 37 is reset to an initial state shown in FIG. 3 by rotation of the operation arm 40.

On the station C, the connecting part 33a of the surface-insulated solid wire 33 of the coil and the plurality of fine wires 34 pass above the clamp holder 35 and are held by the positioning member 36 and the holding member 37 as shown in FIG. 3.

Figure 5:
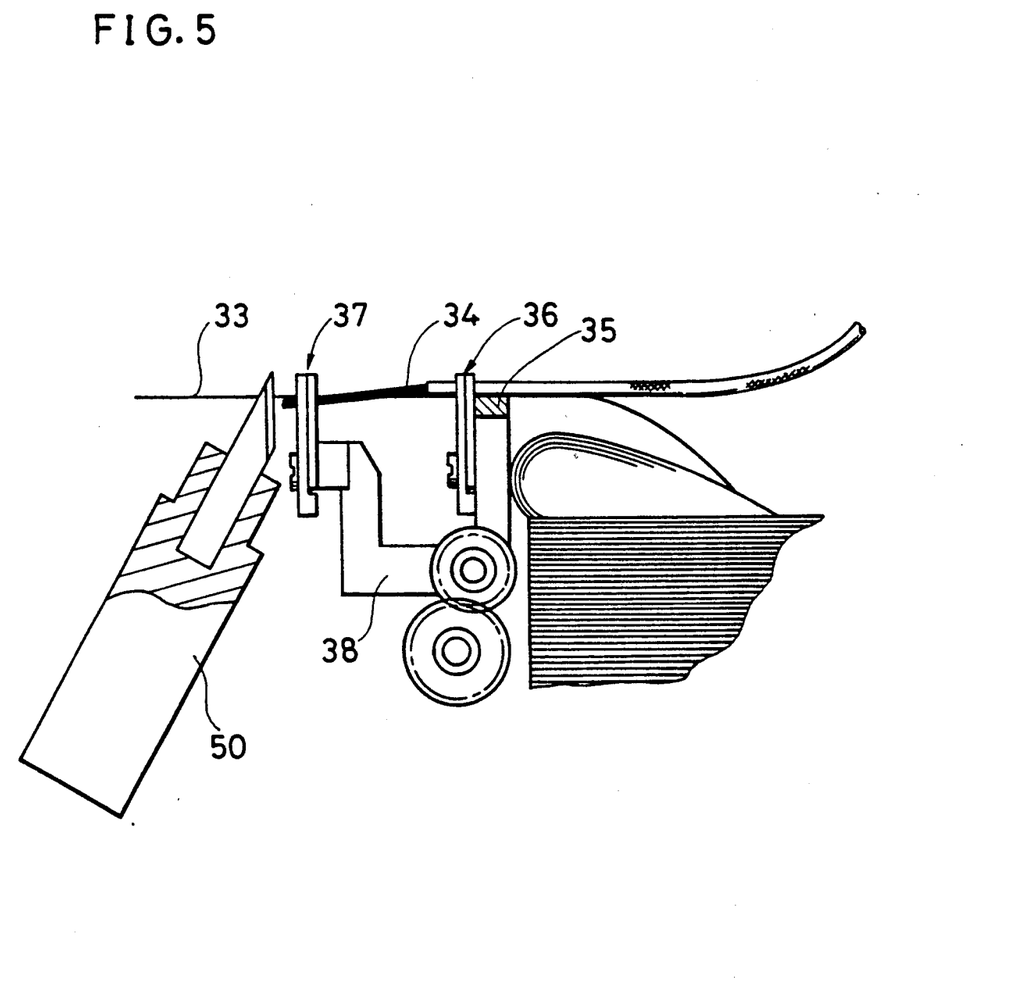
FIG. 5 is a side view showing a condition of wire cutting operation.

On the station D, the extra part of the surface-insulated solid wire 33 protrudinf from the holding member 37 is previously cut by a cutter 50 as shown in FIG. 5.

Figure 1A:
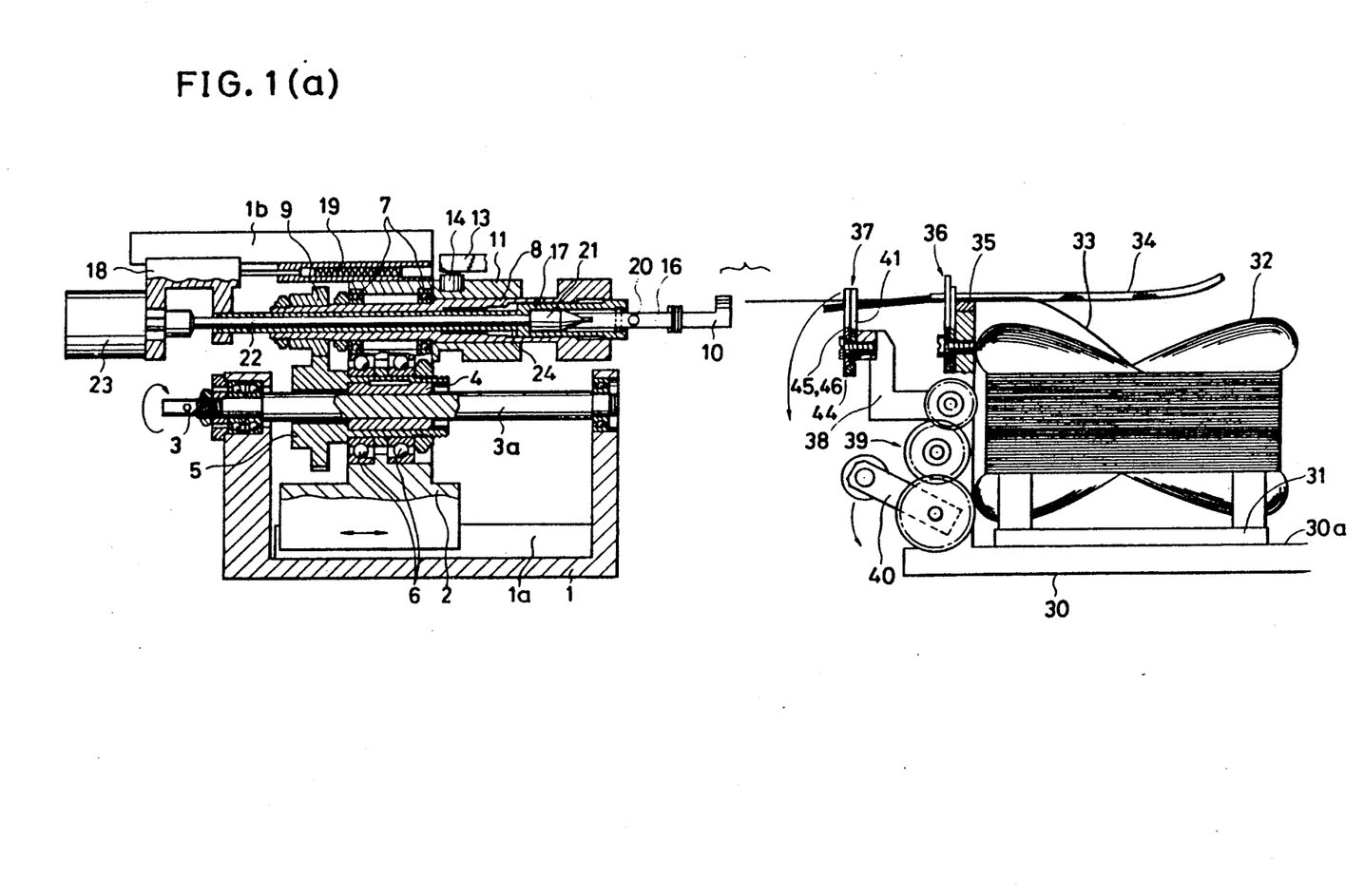
FIG. 1(a) is a cross-sectional side view of a wire connecting apparatus comprising a wire winding unit and a jig unit in accordance with the present invention.
Figure 1B:
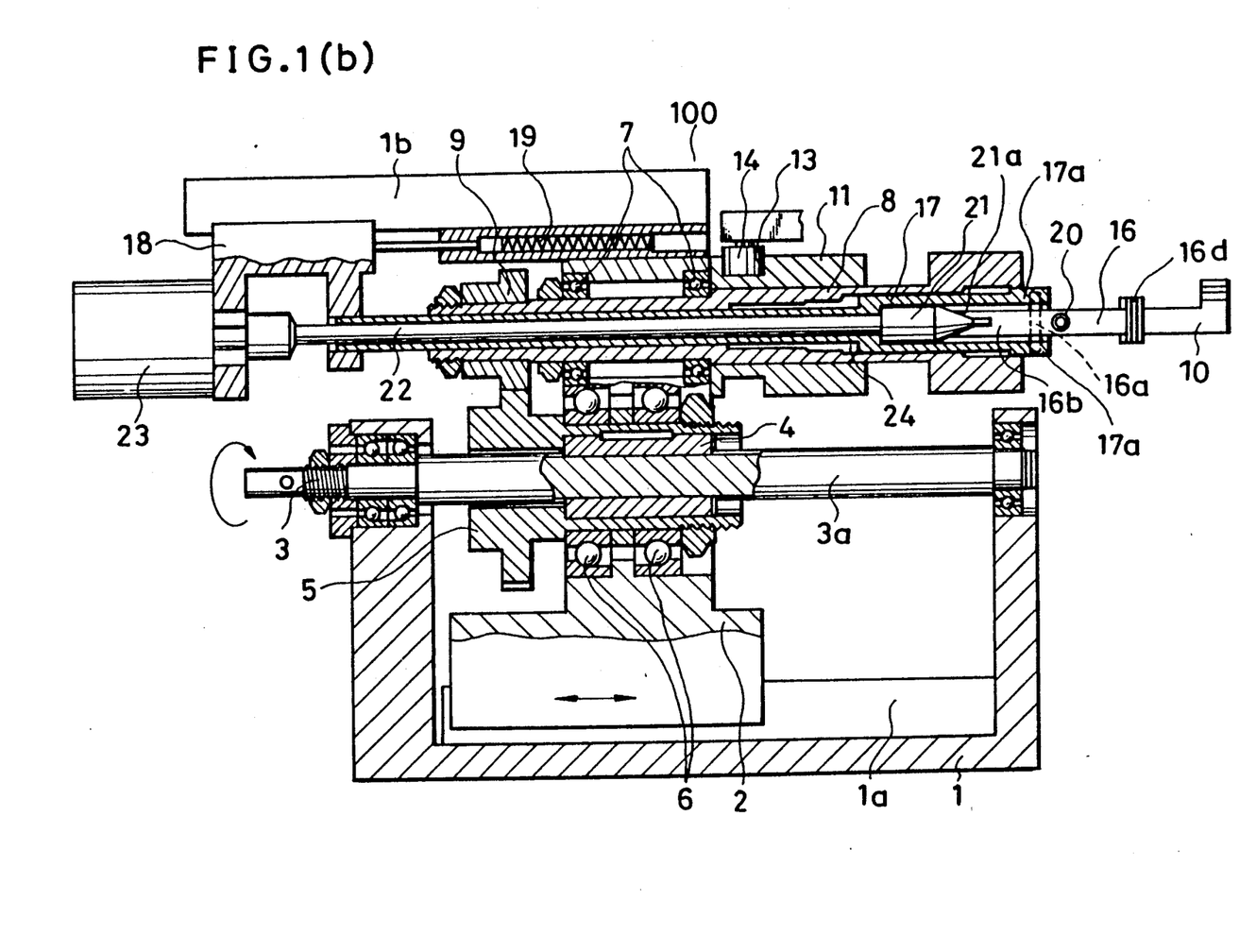
FIG. 1(b) is a cross-sectional side view of a wire winding unit of the wire connecting apparatus in accordance with the present invention.
Figure 2:
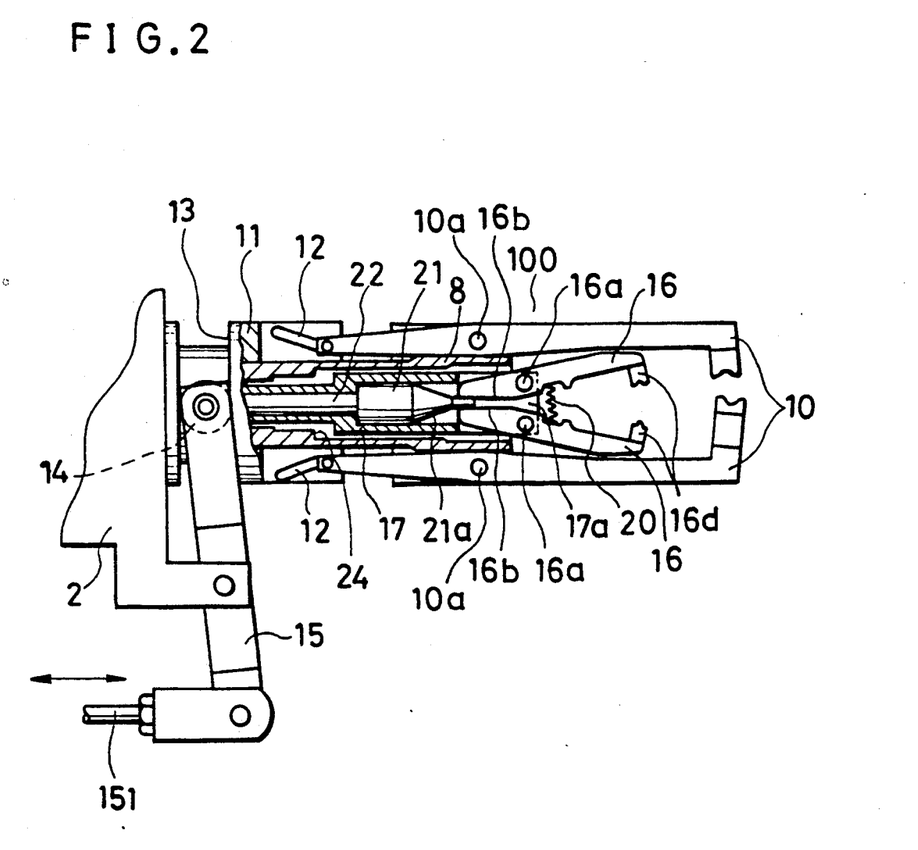
FIG. 2 is a partial plan view of the wire winding apparatus shown in FIG. 1(b).

The jig unit 30, on which the surface-insulated solid wire 33 and the plural fine wires 34 are held as mentioned above, is carried to the station E where a wire winding unit 100 shown in FIGS. 1(a), 1(b) and 2 is provided. The plural fine wires 34 is wound on and around the surface-insulated solid wire 33 by the wire winding unit 100.

Figure 6A:
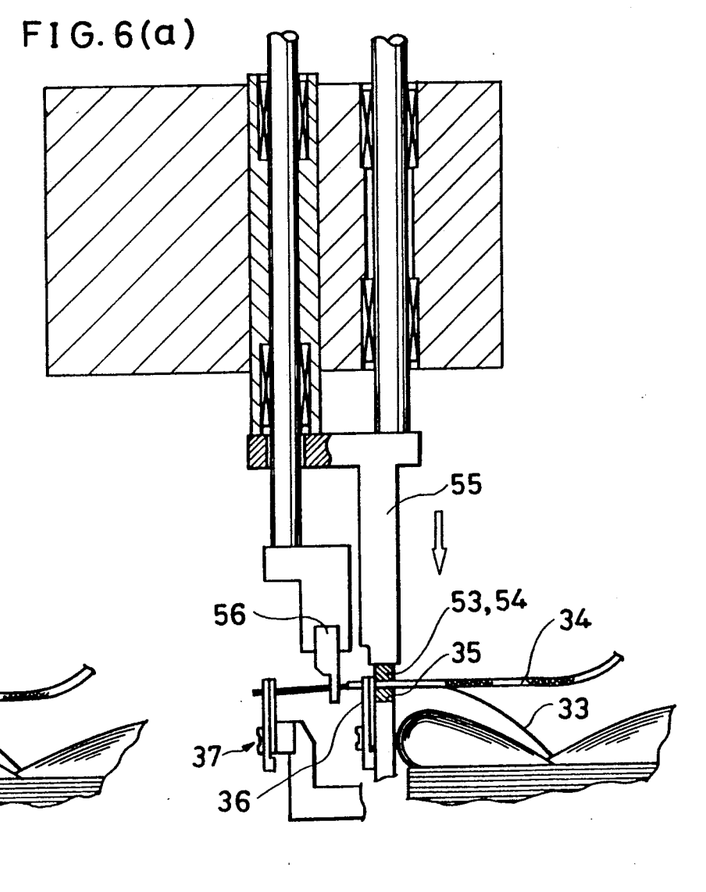
FIG. 6(a) is a side view showing a condition of clamping of the surface-insulated solid wire and the plural fine wires.
Figure 6B:
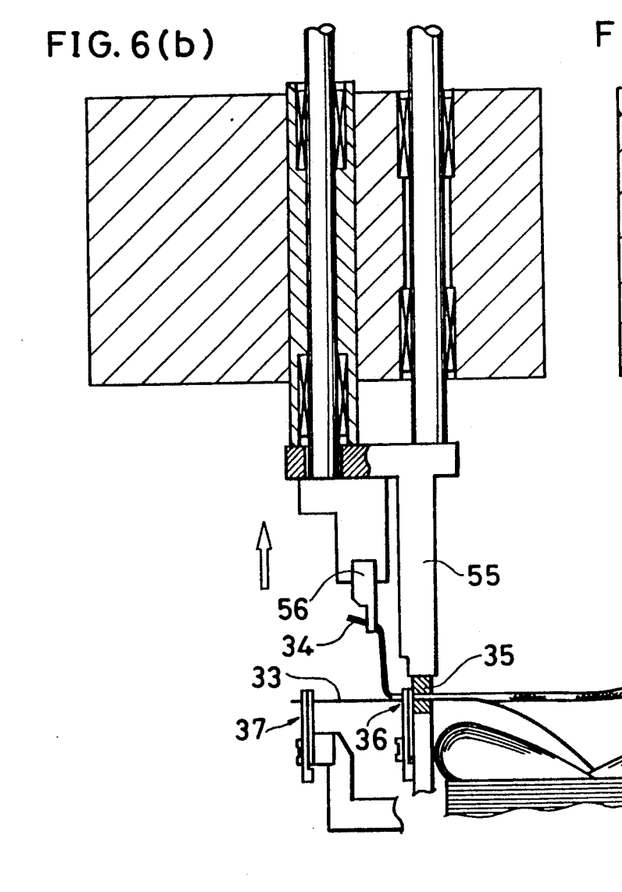
FIG. 6(b) is a side view showing a condition of pulling up of the plural fine wires.

On the station E, a clamp member 55, which has first and second rubber members 53 and 54, which are responding to the surface-insulated solid wire 34 and the plural fine wires 34 on a bottom face thereof, respectively, is moved down to the clamp holder 35 for clamping the surface-insulated solid wire 33 and the plural fine wires 34 between the first and second rubber members 53 and 54 and the clamp holder 35 as shown in FIG. 6(a). A pull-up member 56 is also moved down with the clamp member 55 and coupled with the plural fine wires 34 in the vicinity of the positioning member 36. After that, when the pull-up member 56 is put up, the plural fine wires 34 are pulled up as shown in FIG. 6(b).

On the stations F, G and H, an electric current is supplied to, for example, the pinching members 73 and 74 shown in FIGS. 10(A) and 10(B) pinching the winding part of the plural fine wires 34 and the surface-insulated solid wire 33, respectively, under a pressurized condition. Thereby, the surface insulation coat of the surface-insulation solid wire 33 is melted by heat of the pinching members 73 and 74, and the plural fine wires 34 and the surface-insulated solid wire 33 are electrically and mechanically connected firmly. Furthermore, redundantly protruding part(s) of the wire(s) is (are) cut away by a cutter.

The main part of the wire connecting apparatus in accordance with the present invention, namely the wire winding unit 100 for winding the plural fine wires 34 on the surface-insulated solid wire 34, is described referring to FIGS. 1(A), 1(B) and 2.

FIG. 1(a) shows a relation of the positions of the wire winding unit 100 and the jig unit 30 on the station E. FIG. 1(B) shows the details of the wire winding unit 100. And FIG. 2 shows the top view of main parts of the wire winding unit 100.

In FIG. 1(b), a moving member 2, which is freely movable along a rail 1a is provided on a base frame 1. The moving member 2 is driven in an appropriate speed by a driving apparatus (not shown in the figure because of obviousness). A rotation shaft 3 is born in a rotating manner around and in parallel to the rail 1a on the base frame 1. The rotation shaft 3 is rotated in an appropriate rotation speed by another driving apparatus (not shown in the figure). A spline part 3a is formed on the rotation shaft 3. A nut 4 to be fit on the spline part 3a is fixed on a gear 5 and the gear 5 is coupled in a rotating manner with the moving member 2 via a bearing 6.

A tubular member 8 born in a rotating manner by a bearing 7 is provided on an upper part of the moving member 2. A gear 9 fixed on the tubular member 8 is geared with the gear 5. As shown in FIGS. 1(a), 1(b) and 2, center parts of the outer pinching members 10 are movably pivoted by pins 10a for opening and shutting on an end part of the tubular member 8, for pinching the pulled-up plural fine wires 34 at a position distant from the axis of the tube member 8 in radial direction. A ring member 11 is coupled with the outer periphery of the tube member 8 movably in the axial direction of the tube member 8. Slant grooves 12 are formed on the ring member 11 and rear ends of the outer nipping members 10 are fit in the slant grooves 12. Furthermore, a circular groove 13 is formed around the outer periphery of the ring member 11, and a roller 14 provided on an end of the operation lever 15 fits in the circular groove 13. The operation lever 15 is fulcrumed in a rotating manner on a part of the moving member 2 at a middle portion thereof. Another end of the operation lever 15 is coupled through a link rod 151 with an actuator (not shown in the figure) which pushes and pulls the link rod 151 in directions shown by arrows in FIG. 2. Therefore, the ring member 11 is moved responding to the movement of the operation lever 15, so that the outer pinching members 10 are opened and shut by the movement of the ring member 11 via the slanted grooves 12.

In the tube member 8, a tube-shaped holder 17 is co-axially and slidably provided. Inner pinching members 16, which are for pinching an end of the surface-insulated solid wire 33, are pivoted by pins 16a near end protruded part 17a of the tube-shaped holder 17. Another end of the tube-shaped holder 17 is fixed to a movable member 18 which is held on and movable along an upper rail 1b provided in parallel to the rail 1a. The movable member 18 is normally given a force in a reverse direction (leftward in FIG. 1(b)) by a spring 19. The inner pinching members 16 are normally given a force for being opened by a compression spring 20. An operation member 21 for pushing rear ends 16b of the inner pinching members 16 is slidably provided in the tube-shaped holder 17. An operation rod 22, which is slidably held in the tube-shaped holder 17, is fixed to the operation member 21 at one end, and is connected to an actuator 23 at the other end via the movable member 18 in-between. The operation member 21 and the operation rod 22 are relatively slidable in and against the tube-shaped holder 17. When the operation member 21 pushes the rear ends 16b of the inner pinching members 16, the tapered part 21a of the operation member 21 wedges in a gap between the rear ends 16b. Thereby, the inner pinching members 16 are rotated to close the front ends 16d thereof. On an inner face of the tube member 8, an offset part 24 is provided for coupling with the tube-shaped holder 17 when the tube member 8 is moved in a right-hand direction in FIGS. 1(a), 1(b) and 2.

Next, winding operation of the plural fine wires 34 on the surface-insulated solid wire 33 at the station E is a described. At the station E in FIG. 7, the surface-insulated solid wire 33 and the plural fine wires 34 are clamped by the first and second rubber members 53 and 54, respectively, and the plural fine wires 34 are pulled upward by the pull-up member 56 as shown in FIG. 6(b). After that, when the moving member 2 advances, the inner pinching members 16 come on both sides of the end part of the surface-insulated solid wire 33 and the outer pinching members 10 come on both sides of the end part of the pulled plural fine wires 34.

When the operation lever 15 is moved for advancing the ring member 11 by the actuator (not shown in FIGS. 1(A), 1(B) and 2), the outer pinching members 10 are shut and the plural fine wires 34 are pinched between the outer pinching members 10. A force for pinching the plural fine wires 34 by the outer pinching members 10 is smaller than the pinching force, so that an appropriate tension which is to be applied to the plural fine wires 34 during the winding operation gives an appropriate slip to the pinched plural fine wires. Similarly, when the actuator 23 moves for advancing the operation member 21 via the operation rod 22, the inner pinching members 16 are closed against the force of the spring 20. After that, the holding member 37 for holding the end of the surface-insulated solid wire 33 retracts as shown by arrow in FIG. 3.

Next, the moving member 2 is retreated at a predetermined speed and the rotation shaft 3 is rotated at a predetermined rotation speed. When the rotation shaft 3 is rotated, the tube member 8 is also rotated via the gears 5 and 9. As a result, the outer pinching members 10 held on the tube member 8 are rotated around the surface-insulated solid wire 33 and retreated by the movement of the moving member 2 at the same time. Thereby, the plural fine wires 34 are wound in a spiral manner on the surface-insulated solid wire 33 with a predetermined tension.

At that time, an end of the surface-insulated solid wire 33 is pinched by the inner pinching members 16 and the tube-shaped holder 17 holding the inner pinching members 16 is given a force in a restoring direction by the spring 19. Thereby, the surface-insulated solid wire 33 is pulled by the force of the spring. Hereupon, the tube-shaped holder 17 becomes freely movable in the backward direction since the offset part 24 of the tube member 8 is released from the tube-shaped holder 17 when the moving member 2 moves in the backward direction. As mentioned above, the plural fine wires 34 are wound around the outer surface of the stretched surface-insulated solid wire 33 receiving a predetermined tension. A winding pitch of the plural fine wires 34 is optionally selected by the combination of the moving speed of the moving member 2 and the rotation speed of the rotation shaft 3. For example, a best winding is obtained when the moving member 2 is moved by a distance of ½ or ¾ of the diameter of the plural fine wires 34 per one rotation of the outer pinching members 10 and 10 around the surface-insulated solid wire 33.

When a predetermined turns of the winding of the plural fine wires 34 is over, motions of the actuator for the operation lever 15 (not shown in the figure) and the actuator 23 for the operation rod 22 are released. And thereby, the pinching of the wires 33 and 34 by the outer and inner pinching members 10 10 16 and are also released. The moving member 2 returns to the initial position and the movable member 18 is also returned to the initial position by the spring 19. Then, the clamping of the wires 33 and 34 by the clamping member 55 (FIGS. 6(a) and 6(b) is released.

After that, the jig unit 30 is consecutively carried to the stations F to H. Thereby, the winding-connection part of the plural fine wires 34 and the surface-insulated solid wire 33 is pressed and heated for mechanical and electrical connection.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A wire winding apparatus comprising:
   a jig table;
   at least one jig unit on said jig table, the jig unit having a first and second wire;
   a cutter disposed at a first predetermined position with respect to said jig table for cutting away an excessive part of at least one of said first and second wire;
   a clamp unit disposed at a second predetermined position with respect to said jig table and at a first predetermined position with respect to said jig unit, said clamp unit for clamping said first and second wire in a first predetermined relationship with one another;
   a wire winding means disposed at said second predetermined position with respect to said jig table and at a second predetermined position with respect to said jig unit, said winding unit for connecting to said first and second wire in said first predetermined relationship and winding said second wire around an end portion of said first wire; and
   connecting means disposed at a third predetermined position with respect to said jig unit for electrically and mechanically connecting the second wire wound around an end portion of said first wire to said first wire.

2. The wire winding apparatus as in claim 1, wherein said clamp unit comprises:
   first clamp means for clamping said first and second wires at a first predetermined position from their ends; and
   pull up means for clamping said second predetermined wire at a second predetermined distance from its end and displacing said second wire to form said first predetermined relationship.

3. The wire winding apparatus of claim 1, wherein said jig unit comprises:
   a positioning member for positioning end portions of said first and second wire;
   a removable holding member for clamping said first and second wires in a second predetermined relationship;
   moving means for moving said removable holding member from a clamping position, where said removable holding member clamps said first and second wires, to a retracted position, where said removable holding means is not clamping said first and second wires, and for moving said removable holding member from said retracted position to said clamping position.

4. The wire winding apparatus as in claim 1, where said wire winding means comprises:
   a first wire clamping means for clamping an end of said first wire;
   winding means for clamping, with a force less than a predetermined value, an end of said second wire, and for winding said second wire around said first wire;
   moving means for moving said winding means towards said end of said first wire so that said second wire is wound from a predetermined distance from said end of said first wire towards said end of said first wire.

5. A wire winding unit for winding a first wire around a second wire comprising:
   a first wire clamping means for clamping an end of said first wire;
   winding means for clamping, with a force less than a predetermined value, an end of said second wire, and for winding said second wire around said first wire;
   moving means for moving said winding means towards said end of said first wire so that said second wire is wound from a predetermined distance from said end of said first wire towards said end of said first wire.

6. The wire winding unit as in claim 5, wherein said predetermined distance corresponds to ½-¾ of a diameter of said second wire during winding of one turn of said winding means.

7. The wire winding unit as in claim 5, wherein said first clamping means includes first pinchers which open and close for clamping said end of said first wire; and
   said winding means includes second pinchers which open and close for clamping an end of said second wire, said second pinchers being mounted on a tubular member which is rotatably driven during winding of said second wire around said first wire.

8. The wire winding unit as in claim 7, wherein said first pinchers form an inner set of pinchers within said second pinchers, and said second pinchers pinch said end of said second wire which is displaced vertically with respect to said first wire.

* * * * *